US006192680B1

(12) United States Patent
Brugman et al.

(10) Patent No.: US 6,192,680 B1
(45) Date of Patent: Feb. 27, 2001

(54) SUBSEA HYDRAULIC CONTROL SYSTEM

(75) Inventors: James D. Brugman, Spring; Hubert L. Elkins, Kingwood; Mark A. Merit, Spring, all of TX (US)

(73) Assignee: Varco Shaffer, Inc., Houston, TX (US)

( * ) Notice: Subject to any disclaimer, the term of this patent is extended or adjusted under 35 U.S.C. 154(b) by 0 days.

(21) Appl. No.: 09/353,875

(22) Filed: Jul. 15, 1999

(51) Int. Cl.[7] .................... F16D 31/02
(52) U.S. Cl. .................... 60/398; 60/413
(58) Field of Search .................... 60/398, 413, 415, 60/910

(56) References Cited

U.S. PATENT DOCUMENTS

| | | | |
|---|---|---|---|
| Re. 30,115 | 10/1979 | Herd et al. | 251/63.6 |
| 3,163,985 | 1/1965 | Bouyoucos . | |
| 3,205,969 | 9/1965 | Clark . | |
| 3,436,914 | 4/1969 | Rosfelder . | |
| 3,595,012 | 7/1971 | Beck . | |
| 3,677,001 | 7/1972 | Childers et al. | 60/398 |
| 4,095,421 | 6/1978 | Silcox | 60/398 |
| 4,185,652 | 1/1980 | Zintz et al. . | |
| 4,294,284 | 10/1981 | Herd . | |
| 4,777,800 | 10/1988 | Hay, II | 60/593 |
| 5,357,999 * | 10/1994 | Loth et al. | 137/81.2 |

* cited by examiner

*Primary Examiner*—John E. Ryznic
(74) *Attorney, Agent, or Firm*—Browning Bushman

(57) ABSTRACT

A subsea hydraulic control system 10 supplies hydraulic fluid to operate subsea equipment SE, which in exemplary application may be a blowout preventer having an opening port and a closing port. A hydraulic control system includes a fluid storage vessel 12 for storing a selected quantity of hydraulic fluid, and a separation member 16 separating subsea water from hydraulic fluid while pressurizing the hydraulic fluid in response to the hydrostatic head of the water. A fluid supply line 42 interconnects the fluid storage vessel and the subsea equipment, and a fluid exhaust line 44 interconnects the subsea equipment with a subsea hydraulic fluid reservoir vessel 14. A vent line 38 extends from the fluid reservoir vessel to the surface. A subsea pump periodically exhausts fluid from the fluid storage vessel to the water. The method of the invention provides reliable actuation of subsea equipment, and is particularly well suited for operating subsea equipment in deep water at depths in excess of 6,000 feet.

24 Claims, 3 Drawing Sheets

SUBSEA HYDRAULIC CONTROL SYSTEM

FIELD OF THE INVENTION

The present invention relates to a hydraulic control system for operating subsea equipment. More particularly, this invention relates to a hydraulic control system for operating subsea equipment at relatively deep water depths of 6,000 feet or more. The hydraulic control system is capable of supplying either an opening pressure or a closing pressure to the subsea equipment.

BACKGROUND OF THE INVENTION

Those skilled in the hydrocarbon recovery industry recognize that an increasing percentage of hydrocarbons are being recovered from offshore wells, including wells wherein the subsea wellhead is located in very deep water of 6,000 feet or more below the ocean surface. Subsea blowout preventers (BOPs) and related production control equipment rely upon a source of pressurized fluid to actuate the subsea equipment. Much of this equipment must be actuatable in at least two directions and thus is operated by supplying a hydraulic fluid pressure to either "open" or "close" the equipment. A reliable hydraulic control system to operate the equipment is particularly important in emergency applications wherein the equipment must be actuated to either the closed or the opened position in an emergency.

When subsea equipment is positioned in relatively shallow water of two thousand or three thousand feet, a reliable pressure source to operate the subsea equipment commonly is provided by a bank of accumulator bottles (accumulators), which are conventionally precharged with nitrogen. Each accumulator is thus a sealed container which houses pressurized nitrogen, and a bank of such accumulators may be fluidly interconnected to provide the power source for operating the subsea equipment. The nitrogen thus acts as an available spring force to operate the subsea equipment once hydraulic fluid under pressure is pumped into the accumulators from an external source at the surface. Once the subsea accumulators are activated, additional hydraulic fluid is conventionally transmitted from the surface to the subsea accumulators through hose ambilicals or relatively small conduit fill lines.

While the accumulator system as discussed above performs well on land operations and in relatively shallow subsea operations, significant problems are encountered using this accumulator system at water depths of more than 6,000 feet. The nitrogen precharge pressure must be increased to overcome the effects of hydrostatic head pressure for water depth of the control system. Nitrogen, like other gases, has a reduced expansion as the pressure to which it is subjected gets higher. Moreover, subsea equipment at 10,000 feet or more is inherently cool, and the combination of the cooled and high pressure nitrogen approaches saturation so that the nitrogen tends to lose its expanding characteristics and thus its pressurizing ability on the subsea equipment. As a consequence, numerous banks of accumulators are required to reliably supply activating fluid to a BOP at 10,000 feet, although the same BOP may be reliably controlled at the surface or in shallow waters with only a few accumulators.

At deep water depths, the hydraulic energy stored in the accumulators may be at a pressure of several thousand psi in addition to the hydrostatic head pressure of the surrounding sea water. At a depth of 10,000 feet, for example, the stored pressure would be approximately 5,000 psi plus 4,450 psi hydrostatic head, for a total of 9,450 psi. At this high pressure, the nitrogen in the accumulator is very inefficient since flow characteristics of the nitrogen become very sluggish. For the required capacity of fluid to reliably operate the subsea equipment, the quantity of accumulators required is thus significantly increased. This large number of accumulators represents a high cost to supply fluid to operate the subsea equipment, thereby increasing the overall cost of the hydrocarbon recovery operation.

The disadvantages of the prior art are overcome by the present invention, and an improved hydraulic control system for operating subsea equipment is hereinafter disclosed.

SUMMARY OF THE INVENTION

A system for supplying hydraulic pressure to operate subsea equipment utilizes the hydrostatic head pressure of the surrounding seawater to operate the subsea equipment. A subsea hydraulic fluid storage vessel is provided for storing a selected quantity of hydraulic fluid, which preferably is greater than 80 gallons. A piston or other fluid separation member separates the water from the hydraulic fluid in the fluid storage vessel and also pressurizes the hydraulic fluid in response to the pressure of the water at the depth of the fluid separation member, which in the exemplary application is in excess of 6,000 feet. A fluid supply line fluidly interconnects the fluid storage vessel and both first and second fluid input ports on the subsea equipment. A subsea hydraulic fluid reservoir vessel is provided for receiving hydraulic fluid from the subsea equipment, and a fluid exhaust line fluidly interconnects the subsea equipment with this fluid reservoir vessel. A vent line extends from the fluid reservoir vessel to the surface, which acts as a temporary reservoir for storing hydraulic fluid discharged from the subsea equipment without pressurizing the hydraulic fluid by the subsea hydrostatic head. A subsea pump exhausts fluid from the fluid reservoir vessel. In a preferred embodiment, the hydraulic fluid is a water based fluid, and the pump exhausts the fluid from the fluid reservoir vessel directly to the subsea water.

An electronic subsea control system may be used for selectively controlling the flow of hydraulic fluid from the fluid storage vessel to the first and second fluid input ports. A subsea regulator may be positioned along the fluid supply line to regulate the pressure of hydraulic fluid from the fluid storage vessel to the subsea equipment. An hydraulic fluid supply line may extend from the surface to the fluid storage vessel for initially supplying and resupplying hydraulic fluid to the fluid storage vessel.

According to the method of the invention, a selected quantity of hydraulic fluid is stored in a subsea hydraulic fluid storage vessel. The hydraulic fluid is separated from the seawater which automatically pressurizes hydraulic fluid in response to the hydrostatic head of the seawater pressure. The fluid storage vessel is fluidly interconnected with first and second input ports of the subsea equipment and, upon actuating the equipment, hydraulic fluid is transmitted to a subsea hydraulic fluid reservoir vessel. A vent line is provided for venting the fluid reservoir vessel to the surface, and hydraulic fluid in the fluid reservoir vessel is periodically exhausted, preferably directly to the seawater since the hydraulic fluid may be water based. In the case of an emergency, the energy of the hydraulic fluid storage subsea, which is pressurized by the hydrostatic head of the seawater, is thus available to actuate the subsea equipment, which may include pipe and shear rams.

It is an object of the present invention to provide a subsea hydraulic control system which utilizes a hydrostatic head of seawater to provide the hydraulic energy source which pressurizes fluid to operate the subsea equipment.

Another object of the invention is to provide a subsea hydraulic control system which utilizes a subsea hydraulic fluid reservoir vessel, and a vent line extending from the fluid reservoir vessel to the surface. As a control system is operated, fluid will be forced by seawater pressure to the subsea equipment, and fluid from the subsea equipment will be forced to the fluid storage vessel. As the fluid storage vessel becomes filled with subsea fluid, a pump may be used to empty the fluid back to the seawater. A supply line from the surface to the fluid storage vessel may be used to resupply hydraulic fluid to the fluid storage vessel.

It is a feature of the present invention to provide subsea hydraulic control system which is well suited for operating in very deep water depths of 6,000 feet or more.

It is a feature of the present invention that the hydraulic control system is not adversely affected by the hydrostatic head of seawater at the depth of the control system, and instead the hydrostatic head is used as the driving force for energizing the hydraulic fluid. It is a related feature of the invention that the subsea control system is not adversely affected by the relatively cool temperatures commonly provided at water depths of 6,000 feet of more.

Another feature of the invention is that the fluid pressure to the subsea equipment may be easily controlled by a regulator. An electronic control system may be used to actuate the various valves which control the flow of fluid from the fluid storage vessel to the subsea equipment and from the subsea equipment to a fluid reservoir vessel.

Yet another feature of the invention is that seawater pressurized by its hydrostatic head may be used to operate the subsea equipment.

Still another feature of the invention is that fluid pumped from the subsea reservoir vessel may be input to the subsea storage vessel, thereby obviating the use of a hydraulic fluid supply line.

It is a significant advantage of the present invention that the subsea control system may be used to reliably supply hydraulic fluid pressure to both open and close subsea equipment at water depths in excess of 6,000 feet and at a cost which is significantly reduced compared to prior art systems. It is another advantage of the invention that the subsea control system may be easily redesigned so that seawater rather than hydraulic fluid may be used to supply the fluid pressure to the subsea equipment, thereby eliminating the need for the fluid storage vessel and the supply line from the surface to the fluid storage vessel.

It is another advantage of the present invention that the subsea hydraulic control system may be reliably used to operate subsea equipment even if the flow lines which extend from the control system to the surface are disconnected in an emergency.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
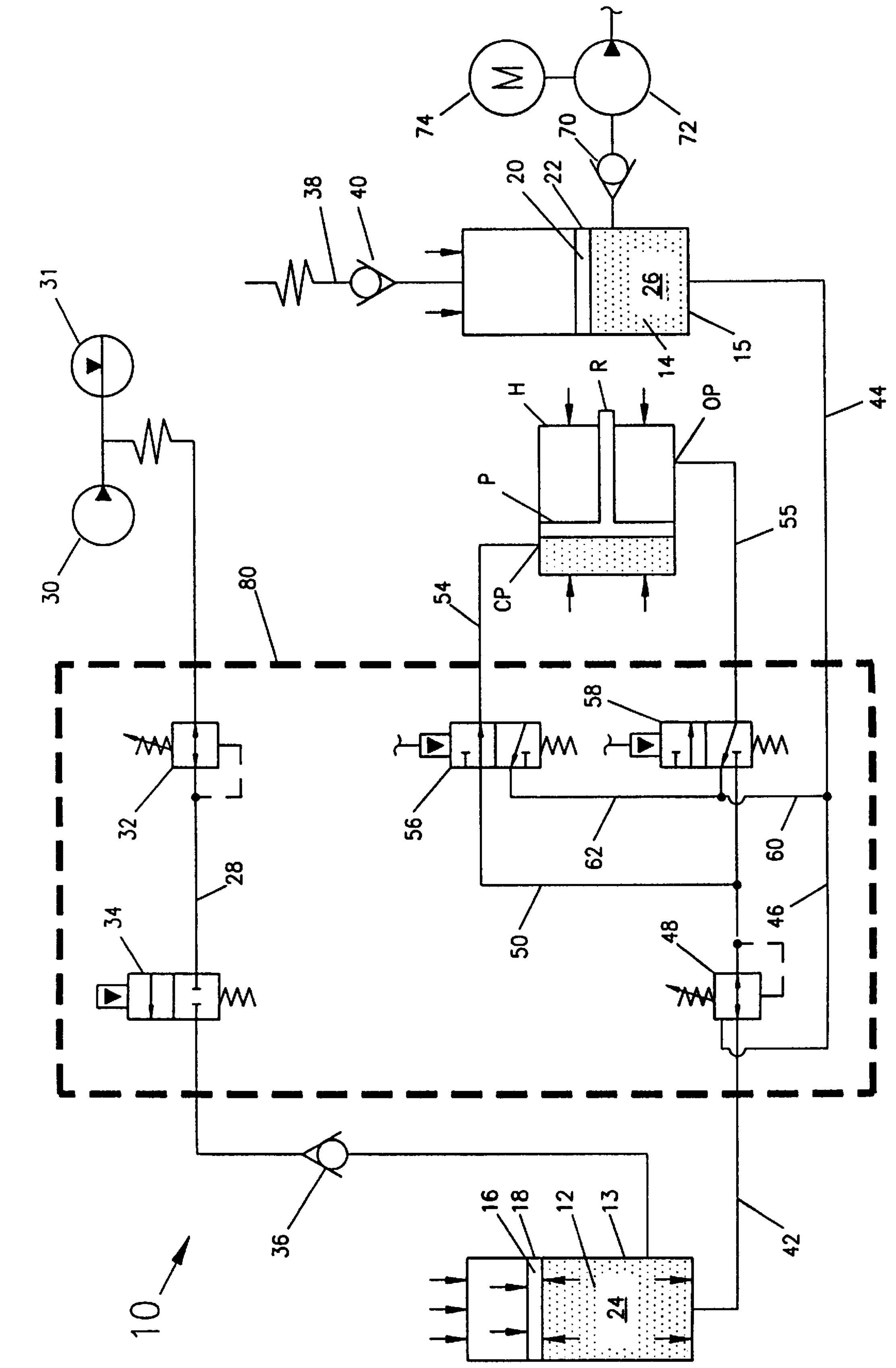
FIG. 1 is a schematic illustration of a suitable subsea control system according to the present invention.
Figure 2:
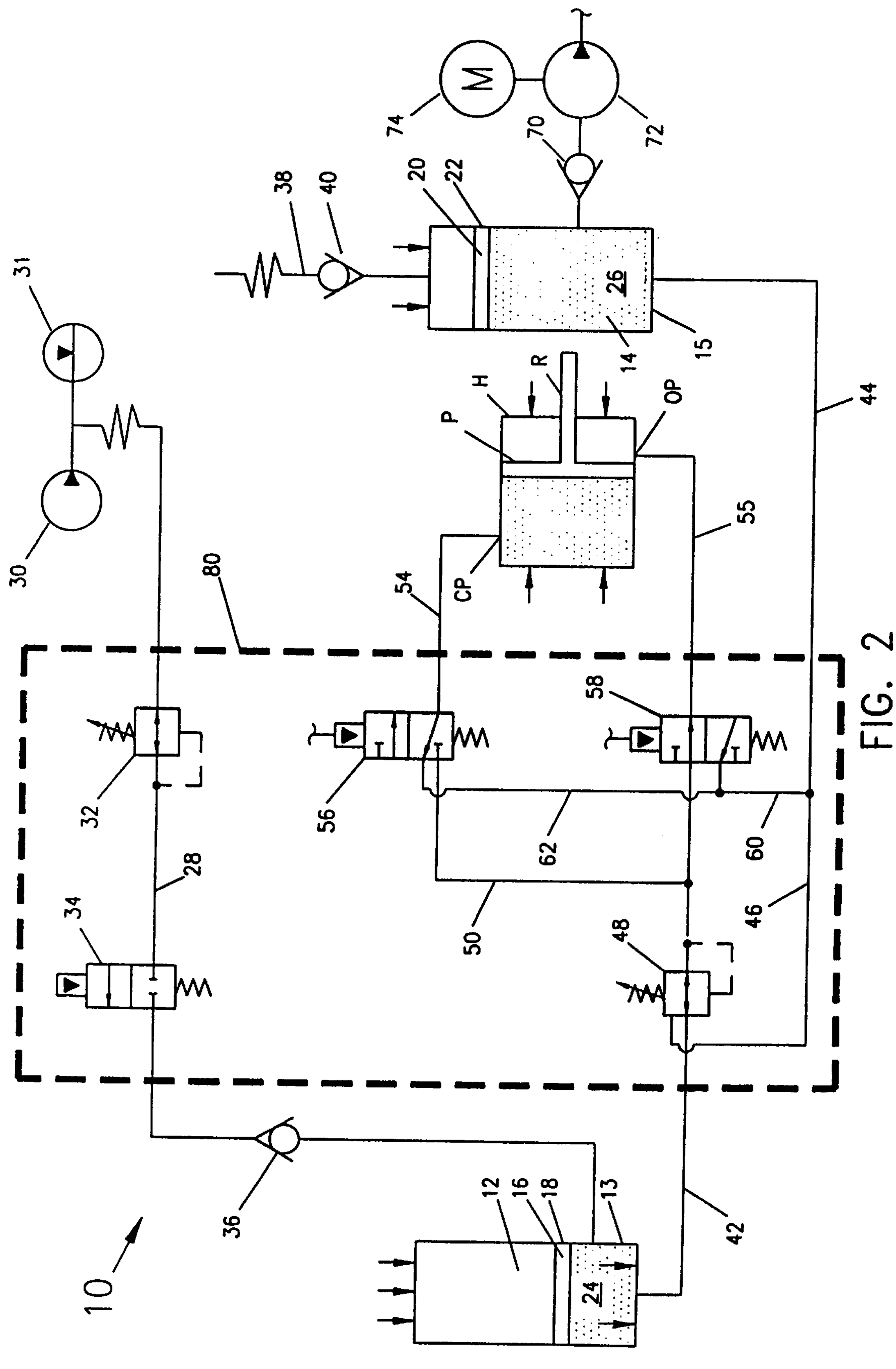
FIG. 2 is a schematic illustration of a portion of the control system shown in FIG. 1 shortly after the hydraulic control system has been actuated to close the subsea equipment.

FIG. 1 is a schematic view of one embodiment of a subsea hydraulic control system 10 according to the present invention for operating subsea equipment SE. In an exemplary embodiment discussed below, it will be assumed that the subsea equipment is a blowout preventer (BOP) located at a water depth of 10,000 feet. The control system of the present invention may be reliably used to operate various types of subsea equipment, including both pipe rams and shear rams, annular BOP's, valves on a subsea stack, lower riser and choke/kill connectors and podjacks. As shown in FIG. 1, the exemplary subsea equipment SE is simplistically shown as a piston P movable within a housing H. The housing includes a closing port CP and an opening port OP. A rod R is connected to the piston and extends from the housing. Accordingly, pressurized fluid in the closing port CP moves the piston to the right from the position as shown in FIG. 1 to the position as shown in FIG. 2, thereby moving the rod R to a closed position. Pressurized fluid at the opening port OP moves the piston to the left from the position as shown in FIG. 2 back to the position as shown in FIG. 1, thereby moving the rod R to the opened position.

Control system 10 includes a subsea hydraulic fluid storage vessel 12 and a subsea hydraulic fluid reservoir vessel 14. For the application as shown in FIG. 1, it may be initially assumed that both the fluid storage vessel 12 and the fluid reservoir vessel 14 are at the same 10,000 foot depth as the subsea equipment SE. The fluid storage vessel 12 includes a piston or other fluid separation member 16 which is movable within housing 13. A conventional seal 18 provides continuous sealing engagement between the moving piston and the inner wall of the housing 13. As shown in FIG. 1, the upper end of the housing 13 is open and thus the piston 16 is subjected to the hydrostatic head of the seawater, which at the 10,000 foot depth is approximately 4450 psi. The piston 16 thus separates the hydraulic fluid 24 in the fluid storage vessel 12 from the seawater, and transmits the hydrostatic head of the seawater to pressurize the hydraulic fluid 24.

Fluid may be initially supplied and is resupplied after actuation of the subsea equipment SE to the fluid storage vessel 12 via a hydraulic fluid supply line 28 which extends from the surface to the fluid storage vessel 12. Conventional pump 30 may thus be provided at the surface for pumping hydraulic fluid at a pressure in excess of 4450 psi through the supply line 28 to the storage vessel 12. An accumulator schematically shown as 31 located at the surface is thus available for supplying and resupplying hydraulic fluid to the fluid storage vessel 12. Fluid pressure along the supply line 28 may be reduced by a conventional pressure regulator 32. A control valve 34 is shown in FIG. 1 in the closed position, and may be actuated by an electronic control signal from a MUX electronic control system described subsequently to be shifted to the opened position for supplying high pressure fluid to the storage vessel 12. A conventional check valve 36 may be spaced fluidly between the valve 34 and the vessel 12 to ensure that hydraulic fluid once contained within the vessel 12 cannot flow back to the surface through the supply line 28. The housing 13 must reliably seal the hydraulic fluid 24 from the subsea water, although the housing 38 normally would not be exposed to a significant pressure differential since the fluid in the housing is at the same pressure as the fluid exterior of the housing.

The subsea hydraulic fluid reservoir vessel 14, on the other hand, includes a housing 15 which must be able to withstand the pressure differential between the hydrostatic head of the seawater and the relatively low pressure within the vessel 14. As shown in FIG. 1, the housing 15 is completely sealed and thus is not exposed to the subsea hydraulic fluid pressure. A vent line 38 extends from the fluid storage vessel 14 to the surface, and a check valve 40 may be provided along this vent line to ensure that fluid flow is limited to the direction from the subsea fluid reservoir vessel 14 to the surface. The vent line 38 at the surface is normally open to atmosphere, and accordingly the upper end of the fluid reservoir vessel 14 is at substantially 0 psi. Another fluid separation member, such as piston 20, optionally may be provided for fluidly isolating the air in the upper end of the housing 15 from the hydraulic fluid 26 in the lower end of the housing 15. A conventional seal 22 provides reliable sealing engagement between the piston 20 and an interior wall of the housing 15 during movement of the piston. In another embodiment, the piston 20 may be eliminated.

Hydraulic fluid 24 at 4450 psi is thus continuously available in the fluid supply line 42 which fluidly interconnects the fluid storage vessel 12 of the subsea equipment SE. This fluid pressure at 4450 psi may be supplied to a selectively controlled regulator 48. As explained subsequently, the depth of the fluid reservoir vessel 14 may be raised above the level of the fluid storage vessel 12 such that the hydrostatic head of fluid in the line 46 is also supplied to the regulator 48. For the exemplary application as shown in FIG. 1, however, the line 46 applies substantially zero psi to the regulator 48, and accordingly the output from the regulator may be maintained at any selected value up to a pressure of 4450 psi induced by the hydrostatic head of the water. This high pressure is thus supplied to the line 50 and the valve 56, and then is input via a line 54 to the closing port CP of the subsea equipment SE. This high fluid pressure will thus force the piston P to the right as shown in FIG. 1, expelling hydraulic fluid through the opening port OP, through the line 55 and through the control valve 58. Hydraulic fluid is thus vented through the control valve 58 and through line 60, then through the fluid exhaust line 44 to the fluid reservoir vessel 14.

When it is desired to operate the subsea equipment SE, an electronically controlled system 80, such as the MUX™ control system commercially available from Varco Shaffer, Inc., may be used to move the control valve 56 to the opened position, as shown in FIG. 1, while maintaining the control valve 58 in the vent position, as shown in FIG. 1.

Referring now to FIG. 2, once the hydraulic control system has operated the subsea equipment SE to the closed position, the volume of hydraulic fluid in the fluid storage vessel 12 is inherently reduced, while the volume of fluid in the fluid reservoir 14 is increased. Again it should be emphasized that fluid in the reservoir 14 is not pressurized since the piston 20 is exposed to substantially atmospheric pressure through the vent line 38.

Once the hydraulic system has been activated to the position as shown in FIG. 2, the electronic control system 80 may activate the motor 74 to power the pump 72, thereby exhausting fluid from the fluid reservoir vessel 14. The exhausted fluid is thus passed through the check valve 70. Since the hydraulic fluid is preferably a water-based fluid, fluid may be exhausted by the pump 72 directly to the water. At the same time, it is important that fluid be resupplied to the fluid storage vessel 12 so that a substantial quantity of fluid will again be available to operate the subsea equipment. Accordingly, the pump 30 may be activated to supply pressurized fluid through the supply line 28 and to the fluid storage vessel 12, thereby raising the piston 16 so that a desired quantity of fluid is again stored in the fluid storage vessel 12. The exhaust pump 72 may discontinue operation once the piston 20 has been lowered sufficiently so that a quantity of fluid caused by another activation of the system 10 may again be output from the subsea equipment SE to the fluid reservoir vessel 14.

In an alternate embodiment of the invention, the output from the exhaust pump 72 may be routed directly to the interior of the fluid storage vessel 12 below the piston 16, rather than expelling the hydraulic fluid to the seawater. This embodiment thus avoids the requirement of a hydraulic fluid line to resupply the vessel 12 after actuation of the control system. The pump 72 is sized for overcoming the hydrostatic head and lift the piston 16 when fluid is exhausted from the vessel 14. A fluid supply line may thus initially be connected to vessel 12 to supply hydraulic fluid, but thereafter would only be required to make up for any leakage of hydraulic fluid from the system.

During a subsequent operation of the hydraulic control system 10, the MUX system 80 as described herein may actuate the valve 58 to the opened position, as shown in FIG. 2, and simultaneously shift the valve 56 to the vent position, as shown in FIG. 2. Pressurized hydraulic fluid is thus passed by the regulator 48 and through the line 55 to supply pressurized hydraulic fluid to the opening port OP, thereby moving the piston P back to the opened position, as shown in FIG. 1. During this opening of the subsea equipment SE, fluid is thus vented through the closed port CP and through the valve 56, through lines 62 and 60, through exhaust line 44, and then to the fluid reservoir vessel 14. Fluid in the vessel 14 may then be exhausted by actuating the pump 72 as previously described while fluid is resupplied to the vessel 12 through the supply line 28. Alternatively, fluid may be exhausted to the vessel 12 via a line which interconnects the output from the pump 72 with the storage vessel 12, as discussed above.

Figure 3:
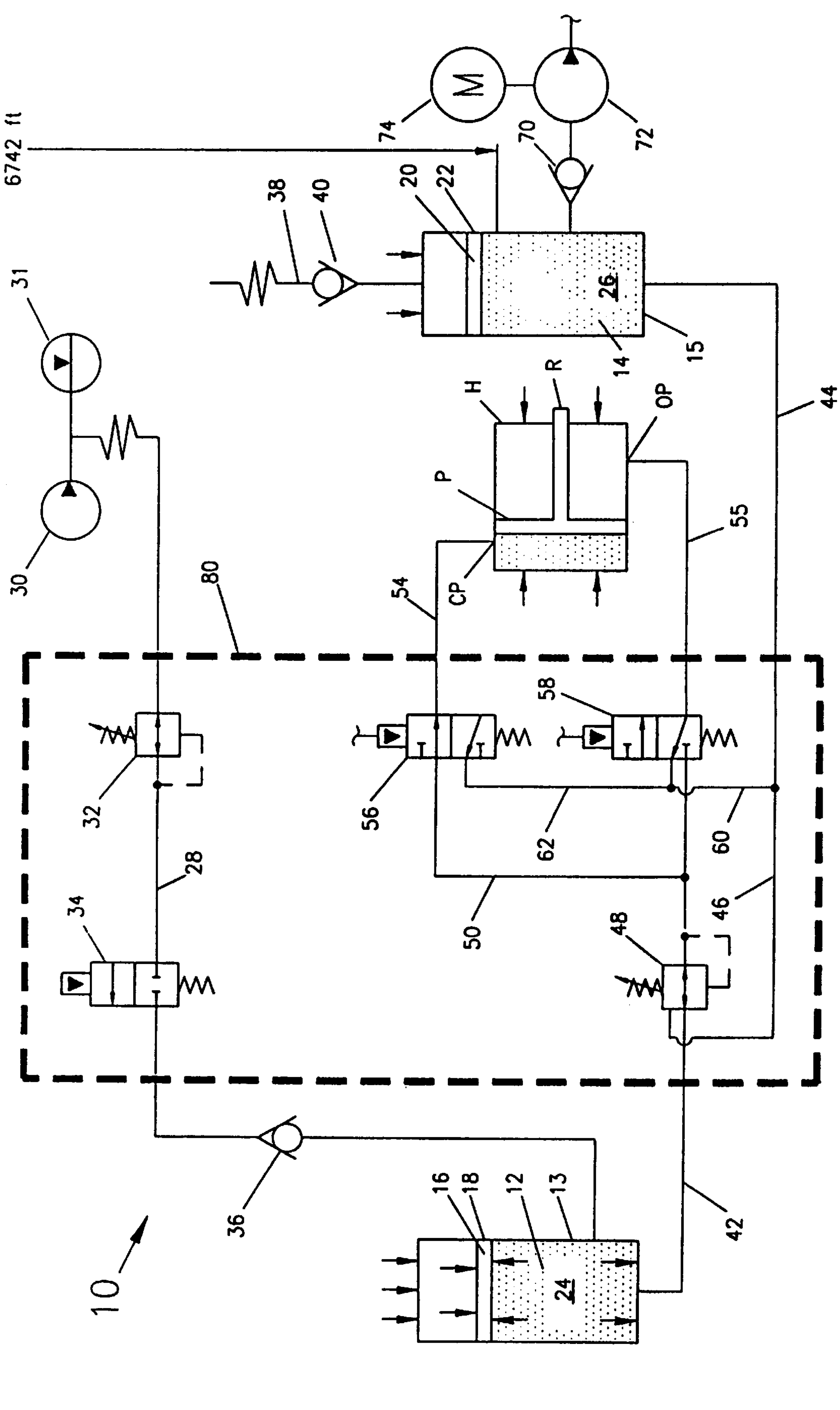
FIG. 3 is a schematic view of a portion of the control system as shown in FIG. 1 with the fluid reservoir vessel positioned at a shallower depth than the fluid storage vessel.

FIG. 3 discloses a control system as discussed above, except that the fluid reservoir vessel 14 in this application has been raised above the fluid storage vessel 12, and in this exemplary application has been positioned at approximately 6750 feet. At this depth, the hydrostatic head of the seawater is approximately 3,000 psi, while as previously noted the hydrostatic head of the water at the 10,000 ft. depth acting on the hydraulic fluid in fluid storage vessel 12 is approximately 4,450 psi. The hydrostatic head of fluid in the lower end of the vent line 44 and in line 46 which is input to the regulator 48 is thus approximately 1,450 psi. Accordingly, for this embodiment the regulator 48 may be set to open at a differential of 3,000 psi, i.e., the difference between the 4,550 psi and the 1,450 psi levels input to the regulator 48. As a consequence of raising the fluid reservoir vessel 14 to this level, the differential across the piston P in subsea equipment SE is only 3,000 psi, and similarly the maximum differential across the valve 56 is only 3,000 psi. By raising the fluid reservoir vessel 14 to 6,740 ft., a back pressure of 1,450 psi is thus always maintained on the piston of the subsea equipment. Also, this raising of the subsea equipment results in reduced requirements for the pump 72, which must now only be capable of overcoming the hydrostatic head of seawater at 3,000 psi when pumping fluid out of the fluid reservoir vessel 14. By raising the vessel 14, the desired pressure differential cross the subsea equipment SE may be controlled without the use of numerous pressure regulators. Also, the wall thickness of the vessel 14 may be reduced since it seals a lower pressure differential than the vessel 12.

The method according to the present invention should be understood from the foregoing description. Subsea hydraulic control system 10 is responsive to the MUX™ Control System, which operates the valves to supply hydraulic pressure to control the opening and closing (or similar operation) of the subsea equipment SE. After each sequencing of the equipment SE, pump 72 is activated to exhaust fluid from the fluid reservoir vessel 14. The valve 34 may also be opened by the MUX™ Control System, and the pump 30 at the surface activated to resupply pressurized fluid to the fluid storage vessel 12, thereby raising the piston 18 so that a new quantity of fluid is available to operate the subsea equipment. Alternatively, pump 72 may discharge fluid from vessel 14 back to vessel 12.

The key to the reliability of the control system according to the present invention is the ability of the control system to operate the subsea equipment at least one once during an emergency, i.e., in an offshore storm or other emergency situation in which the surface vessel must leave the site. The control system is thus intended to activate or close the subsea equipment SE after the surface vessel (not shown) is separated from the supply line 28 and the vent line 38. The selected quantity of fluid in the fluid storage vessel 12 is thus available to actuate the subsea equipment, which in an exemplary application consists of closing two sets of shear rams, closing various valves on the subsea stack, unlocking the lower riser and choke/kill connectors, and jack-up the pods. Even in this emergency situation with the line 28 separated, the hydrostatic head of the seawater pressure acting on the piston 16 thus provides a force which is required to reliably operate the subsea equipment. Also, even though the vent line 38 may be separated, the housing 15 is sealed from the subsea pressure by the check valve 40, and thus substantially only 0 psi exists within the fluid reservoir vessel 14. If the vent line 38 is severed in the water, a hydrostatic head of the water may thus act against the closed check valve 40. The fluid reservoir vessel 14 nevertheless may be sufficiently sized so that it may receive fluid from the subsea equipment SE during this emergency situation and yet a sufficiently large air pocket is maintained within the housing 15 so that the pressure of hydraulic fluid 26 in the fluid reservoir vessel 14 may rise to, e.g., 100 psi, but will still be substantially lower than the pressure output by the fluid storage vessel 12. Accordingly, a sufficient pressure differential will be available to move the piston P to the closed position. The volume of the vessel 14 may thus be 25% or more greater than the volume of the vessel 12.

It is thus important that the control system of the present invention provide the fluid at locations adjacent subsea equipment and stored under pressure sufficient to operate the subsea equipment. After the emergency and when the vessel returns to the site and reconnects to the supply line 28 and the vent line 38, the pump 72 may be first activated to exhaust fluid from the fluid reservoir vessel 14, and the pump 30 then activated to resupply hydraulic fluid to the fluid storage vessel 12. In another embodiment of the invention, a battery or other power source may be provided for operating the motor 74 during an emergency, thereby allowing the pump 72 to be automatically operated in response to the MUX™ system, thereby ensuring that fluid discharged from the subsea equipment SE remains at a very low pressure within the fluid reservoir vessel 14.

The pump 72 is sized as explained above, to ensure fluid can be exhausted from the fluid storage vessel into the water or back to the vessel 12, and thus is capable of overcoming a hydrostatic head of the water at the depth of the discharge. The fluid flow capability of the pump 72 need not be particularly large, however, since the fluid reservoir 14 may be sized to reliably ensure that it can hold all of the fluid discharged by the subsea equipment SE. In a typical application, pump 72 may thus be sized for discharging hydraulic fluid at approximately 25 to 100 GPM into the water. A pump 30 at the surface must be able to generate a pressure greater than that necessary to overcome the hydrostatic head of the water at the fluid storage vessel 12. While it is important to resupply the fluid storage vessel 12 with hydraulic fluid after the subsea equipment is actuated so that fluid will again be available for another actuation of the subsea equipment, the time required to resupply fluid to the vessel 12 is not particularly critical, and accordingly the pump 30 would typically have a flow rate of from 25 to 100 GPM. Relatively large capacity pumps are normally available at the surface to test the subsea equipment via separate lines which directly connect the surface pumps with the subsea equipment. Substantially lower capacity pumps may be used, if desired, to resupply the vessel 12 with hydraulic fluid.

It is important that the fluid storage vessel 12 be sized to make available to the subsea equipment SE at least the quantity of fluid which will be required in an emergency to fully actuate the various subsea equipment. In most applications, the fluid storage vessel SE will be sized to hold at least 80 gallons of the hydraulic fluid, and typically at least 80 gallons to 120 gallons of hydraulic fluid. This volume is thus sufficient to operate subsea equipment as discussed above in an emergency. The fluid reservoir vessel 14 similarly must have a volume in this range to be able to hold the fluid exhausted by the subsea equipment SE and, as explained above, may have a volume in excess of a fluid storage capacity of the vessel 12 to ensure that, in an emergency, the pressure in the fluid reservoir vessel 14 remains sufficiently low. The fluid storage vessel may thus have a capacity in excess of 100 gallons.

Vessels 12 and 14 conventionally may be fabricated from metal, and in a common application may have a diameter of approximately 20 inches and an axial length of 8 feet or more. Those skilled in the art will recognize, however, that the material for the vessels 12 and 14 and the shape of the vessels are not critical to the present invention, and in alternate embodiments these vessels may be expandable or flexible bag-like members. Each vessel may be housed with a portion of the BOP stack guide structure or a part of the guide structure may form the vessel wall. Also, those skilled in the art will appreciate that various types of fluid separation members other than pistons may be reliably used to separate the fluid from the seawater, and other conventional fluid separation members which nevertheless reliably transmit hydraulic fluid forces across separation may be used, such as diaphragms or bladders. Fluid supply line 28 which extends from the surface to the fluid storage vessel 12 conventionally has a relatively small diameter, and many applications may be a one inch or larger line. This flow line must withstand the differential between the high pressure output by the pump 30 and the hydrostatic head acting on the flow line at the particular depth under consideration. The flow line should be sized to achieve relatively low fluid flow losses when fluid is pumped from the surface to the depths of the fluid storage vessel 12. The vent line 38 similarly may be a relatively small diameter line and also must be able to withstand the differential of atmospheric pressure in the vent line and the high hydrostatic head pressure of water surrounding the vent line. Both the lines 28 and 38 may conventionally attached to a marine riser which extends from the surface to the subsea well head.

Those skilled in the art will appreciate that the subsea hydraulic control system and the method of the present invention are thus well suited for achieving the objectives discussed above. The system is able to reliably operate various types of subsea equipment, and the particular subsea equipment discussed above and simplistically shown in the drawings should be understood as merely exemplary of conventional equipment which has a fluid opening port and a fluid closing port, so that the control system is able to actuate the subsea equipment in both directions, i.e., in an opening direction and in a closing direction.

In another embodiment of the invention, subsea equipment may be modified so that it is able to reliably operate in response to fluid which is not hydraulic fluid and instead is seawater. This may require a substantial modification to the subsea equipment, since most subsea equipment is constructed to operate in response to hydraulic fluid and not seawater. A significant advantage of this alternative embodiment, however, is that the fluid storage vessel 12 and the supply line 28 may then be completely eliminated. In one embodiment, the line 42 to the regulator 48 is simply exposed to seawater. The MUX™ system for controlling the valves may then be used with a fluid reservoir vessel 14. In another embodiment, the closing port CP and the opening port OP of the subsea equipment SE are alternatively exposed to seawater. A vent line 38 is nevertheless still used to ensure that the fluid exhausted from the subsea equipment may be stored at a pressure substantially less than the hydrostatic head oil the fluid being input to actuate the subsea equipment.

The control system of the present invention is thus the primary system used to actuate the subsea equipment during both normal operations and during an emergency. The system of the present invention is particularly well suited for operating subsea equipment at relatively deep water depths in excess of 6,000 feet. While the subsea valves and regulators as described herein may be reliably operated by a MUX™ system of the type available from Varco Shaffer, Inc., those skilled in the art will appreciate the various types of control systems may be used to operate the various components of the subsea system.

Various other modifications may be made to the control system and to the method of operating subsea equipment may be made without departing from the spirit of the invention. Such further modifications should be apparent to those skilled in the art in view of this disclosure. It should thus be understood that the invention is not limited to the disclosed embodiments and instead that the scope of the invention should include all embodiments within the following claims.

What is claimed is:

1. A system for supplying hydraulic fluid to operate subsea equipment having first and second fluid input ports, the system comprising:

a subsea hydraulic fluid storage vessel for storing a selected quantity of hydraulic fluid;

a storage vessel fluid separation member separating water from the hydraulic fluid in the fluid storage vessel while pressurizing the hydraulic fluid in response to the pressure of the water at the depth of the fluid separation member;

an equipment supply line fluidly interconnecting the fluid storage vessel and both the first and second fluid input ports on the subsea equipment;

a subsea hydraulic fluid reservoir vessel for receiving hydraulic fluid from the subsea equipment;

a fluid exhaust line fluidly interconnecting the subsea equipment and the fluid reservoir vessel;

a vent line extending from the fluid reservoir vessel to the surface; and a subsea pump for exhausting fluid from the fluid reservoir vessel.

2. The system as defined in claim 1, further comprising:

a subsea control system for selectively controlling the flow of hydraulic fluid from the fluid storage vessel to the first and second fluid input ports.

3. The system as defined in claim 1, further comprising:

a subsea regulator for regulating the pressure of hydraulic fluid from the fluid storage vessel to the subsea equipment.

4. The system is defined in claim 3, when the subsea regulator is responsive to a hydrostatic head of hydraulic fluid in the fluid exhaust line.

5. The system as defined in claim 1, further comprising:

a selectively actuatable closing valve for controlling the flow of high pressure fluid to the first fluid input port; and a selectively actuatable opening valve for controlling the flow of fluid to the second fluid input port.

6. The system as defined in claim 1, further comprising:

a hydraulic fluid supply line extending from the surface to the fluid storage vessel for supplying hydraulic fluid to the fluid storage vessel.

7. The system as defined in claim 1, wherein the fluid storage vessel has a capacity to store at least 80 gallons of hydraulic fluid.

8. The system as defined in claim 1, wherein the pump exhausts the fluid in the fluid reservoir vessel to the water.

9. The system as defined in claim 1, wherein the pump exhausts the fluid in the fluid reservoir vessel back to the fluid storage vessel.

10. The system as defined in claim 1, wherein hydraulic fluid is a water based fluid.

11. A system for supplying hydraulic fluid to operate subsea equipment having a fluid opening port and a fluid closing port, the system comprising:

a subsea hydraulic fluid storage vessel for storing at least 80 gallons of water based hydraulic fluid;

a storage vessel fluid separation member separating water from the hydraulic fluid in the fluid storage vessel while pressurizing the hydraulic fluid in response to the pressure of the water at the depth of the fluid separation member;

a hydraulic fluid supply line extending from the surface to the fluid storage vessel for supplying hydraulic fluid to the fluid storage vessel;

an equipment supply line fluidly interconnecting the fluid storage vessel and both the fluid opening port and the fluid closing port on the subsea equipment;

a subsea hydraulic fluid reservoir vessel for receiving hydraulic fluid from the subsea equipment;

a fluid exhaust line fluidly interconnecting the subsea equipment and the fluid reservoir vessel;

a vent line extending from the fluid reservoir vessel to the surface;

a subsea pump for exhausting fluid from the fluid reservoir vessel to the water; and a subsea control system for selectively controlling the flow of hydraulic fluid from the fluid storage vessel to the fluid opening port and the fluid closing port.

12. The system as defined in claim 11, further comprising:

a selectively actuatable closing valve for controlling the flow of high pressure fluid to the fluid closing port; and a selectively actuatable opening valve for controlling the flow of fluid to the fluid opening port.

13. The system as defined in claim 11, further comprising:

a subsea regulator for regulating the pressure of hydraulic fluid supplied to the subsea equipment.

14. A method of hydraulically operating subsea equipment having first and second fluid input ports, the method comprising:

storing a selected quantity of hydraulic fluid in a subsea hydraulic fluid storage vessel;

separating water from the hydraulic fluid in the fluid storage vessel while pressurizing the hydraulic fluid in response to the pressure of the water;

fluidly interconnecting the fluid storage vessel and the first and second input ports of the subsea equipment;

fluidly interconnecting the subsea equipment and a subsea hydraulic fluid reservoir vessel;

extending a vent line from the fluid reservoir vessel to the surface;

receiving hydraulic fluid from the subsea equipment in the subsea hydraulic fluid reservoir vessel; and exhausting fluid from the fluid reservoir vessel.

15. The method as defined in claim 14, wherein the fluid in the fluid reservoir vessel is exhausted to the water.

16. The method as defined in claim 14, wherein the fluid in the fluid reservoir vessel is exhausted back to the fluid storage vessel.

17. The method as defined in claim 14, further comprising:

raising the level of the fluid reservoir vessel relative to the level of the fluid storage vessel to affect the pressure differential to the subsea equipment.

18. The method as defined in claim 14, further comprising:

selectively controlling the flow of hydraulic fluid from the subsea fluid storage vessel to the first and second fluid input ports.

19. The method as defined in claim 14, further comprising:

extending a hydraulic fluid supply line from the surface to the fluid storage vessel for supplying hydraulic fluid to the fluid storage vessel.

20. The method as defined in claim 14, further comprising:

regulating the pressure of hydraulic fluid from the fluid storage vessel to the subsea equipment.

21. A system for supplying pressurized seawater to operate subsea equipment having first and second fluid input ports, the system comprising:

the first and the second fluid input ports on the subsea equipment being selectively in fluid communication with seawater pressurized by its hydraulic head;

a subsea hydraulic fluid reservoir vessel for receiving seawater from the subsea equipment;

a fluid exhaust line fluidly interconnecting the subsea equipment and the fluid reservoir vessel;

a vent line extending from the fluid reservoir vessel to the surface;

a subsea pump for exhausting water from the fluid reservoir vessel; and a subsea control system for selectively controlling the flow of water fluid from the subsea equipment to the fluid storage vessel.

22. The system as defined in claim 21, wherein the capacity of the fluid reservoir vessel is in excess of 100 gallons.

23. A method of hydraulically operating subsea equipment having first and second fluid input ports, the method comprising:

selectively exposing the first and second input ports of the subsea equipment to seawater pressurized by its hydrostatic head;

fluidly interconnecting the subsea equipment and a subsea hydraulic fluid reservoir vessel;

extending a vent line from the fluid reservoir vessel to the surface;

receiving seawater from the subsea equipment in the subsea hydraulic fluid reservoir vessel; and exhausting seawater from the fluid reservoir vessel.

24. The method as defined in claim 23, further comprising:

raising the level of the fluid reservoir vessel relative to the level of the subsea equipment to affect the pressure differential to the subsea equipment.

* * * * *